United States Patent
Zhong

(10) Patent No.: US 8,767,811 B2
(45) Date of Patent: *Jul. 1, 2014

(54) BACK CHANNEL ADAPTATION USING CHANNEL PULSE RESPONSE

(75) Inventor: Lizhi Zhong, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/561,301

(22) Filed: Jul. 30, 2012

(65) Prior Publication Data

US 2014/0029651 A1    Jan. 30, 2014

(51) Int. Cl.
*H03H 7/30* (2006.01)

(52) U.S. Cl.
USPC .......... 375/229; 375/219; 375/230; 375/232; 375/295; 375/316

(58) Field of Classification Search
USPC ......... 375/219, 220, 222, 224, 229–232, 262, 375/271, 279, 295, 298, 302, 316, 320, 322, 375/336, 342, 346, 347
See application file for complete search history.

(56) References Cited

U.S. PATENT DOCUMENTS

| | | | |
|---|---|---|---|
| 6,400,761 B1 | 6/2002 | Smee et al. ................... | 375/232 |
| 7,233,617 B2* | 6/2007 | Gorecki ........................ | 375/232 |
| 7,257,181 B2 | 8/2007 | Jones et al. .................... | 375/350 |
| 7,277,477 B1* | 10/2007 | Ahmad .......................... | 375/220 |
| 8,160,166 B2* | 4/2012 | Moffatt et al. ................. | 375/260 |
| 2001/0043650 A1* | 11/2001 | Sommer et al. ................ | 375/232 |
| 2008/0175308 A1* | 7/2008 | Fimoff et al. ................. | 375/232 |
| 2010/0020860 A1* | 1/2010 | Dai et al. ...................... | 375/231 |
| 2010/0177816 A1* | 7/2010 | Malipatil et al. .............. | 375/233 |
| 2012/0170621 A1* | 7/2012 | Tracy et al. ................... | 375/219 |
| 2012/0230383 A1* | 9/2012 | Currivan et al. .............. | 375/232 |
| 2013/0195154 A1* | 8/2013 | Mobin et al. .................. | 375/219 |
| 2013/0230092 A1* | 9/2013 | Prokop et al. ................. | 375/233 |

* cited by examiner

*Primary Examiner* — Hirdepal Singh
(74) *Attorney, Agent, or Firm* — Christopher P. Maiorana, PC

(57) ABSTRACT

An apparatus having a transmitter is disclosed. The transmitter generally has a filter coupled to a communication channel. The transmitter may be configured to adjust the filter using information based on an estimate of one or more characteristics of the communication channel.

20 Claims, 9 Drawing Sheets

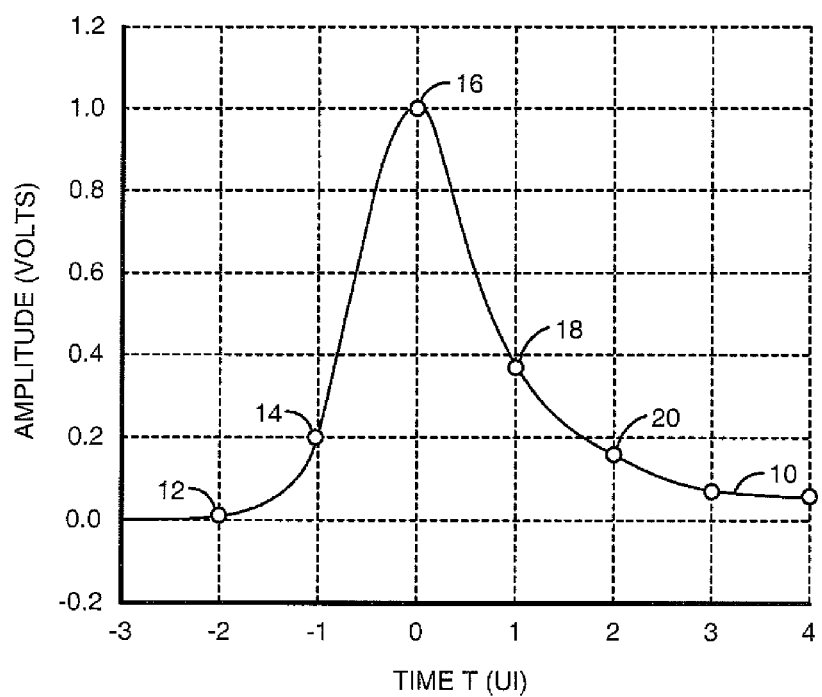
FIG. 1
(CONVENTIONAL)

US 8,767,811 B2

BACK CHANNEL ADAPTATION USING CHANNEL PULSE RESPONSE

FIELD OF THE INVENTION

The present invention relates to transmitter equalizer adaptation generally and, more particularly, to a method and/or apparatus for implementing a back channel adaptation using a channel pulse response.

BACKGROUND OF THE INVENTION

The performances of communication channels are becoming more sensitive to tap weight values set in a filter of a transmitter. Since the optimal tap weights can vary from channel to channel, manually setting the transmitter tap weight values for each channel is not convenient. Alternatively, using the same tap weight values for a group of channels incurs a performance penalty since the same tap weight values may not be appropriate for every channel in the group.

Referring to FIG. 1, a diagram illustrating a normalized graph of a conventional unequalized channel pulse response 10 is shown. A single impulse generated by the transmitter has a normalized duration of a unit interval (i.e., 1 UI) or symbol interval, with a time zero corresponding to a current cursor 16. Samples 12-14 correspond to an inter symbol interference (i.e., ISI) to future symbols and are called precursor ISI. Samples 18-20 correspond to the IST of past symbols and are called postcursor ISI. Adapting the tap weights of the transmitter filter accordingly helps to reduce both the precursor ISI and the postcursor ISI.

It would be desirable to implement a method and/or apparatus for implementing a back channel adaptation using a channel pulse response.

SUMMARY OF THE INVENTION

The present invention concerns an apparatus having a transmitter. The transmitter generally has a filter coupled to a communication channel. The transmitter may be configured to adjust the filter using information based on an estimate of one or more characteristics of the communication channel.

The objects, features and advantages of the present invention include providing a method and/or apparatus for implementing a back channel adaptation using a channel pulse response that may (i) use a channel pulse response to adapt the transmit filter tap weights to a communication channel, (ii) use tap weights of a decision feedback equalizer in a receiver to estimate the channel pulse response, (iii) simplify the pulse response estimation, (iv) simplify the adaptation of the transmit filter, (v) reduce a size of tap weight coefficients where the tap weight step sizes are binary multiples of each other, (vi) adapt the transmitter filter to equalize the transmitted signal such that the ISI at an eye center is minimized, (vii) adapt the transmitter filter to equalize the transmitted signal such that the ISI at data transitions is minimized and/or (viii) be implemented in a serializer-deserializer apparatus.

BRIEF DESCRIPTION OF THE DRAWINGS

These and other objects, features and advantages of the present invention will be apparent from the following detailed description and the appended claims and drawings in which:

FIG. 1 is a diagram illustrating a normalized graph of a conventional unequalized channel pulse response;

DETAILED DESCRIPTION OF THE PREFERRED EMBODIMENTS

Figure 2:
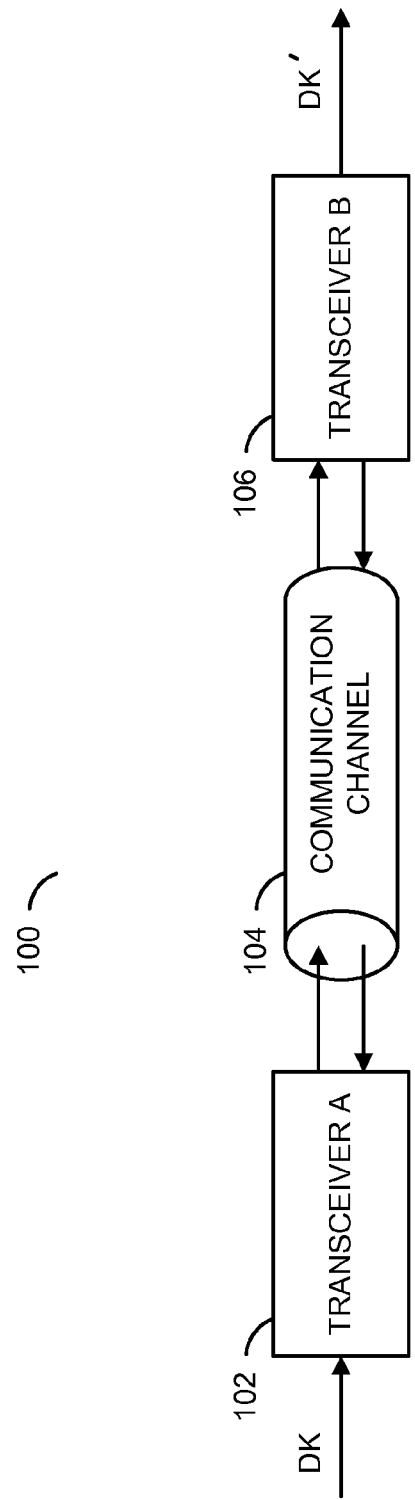
FIG. 2 is a block diagram of an apparatus in accordance with a preferred embodiment of the present invention.

Referring to FIG. 2, a block diagram of an apparatus 100 is shown in accordance with a preferred embodiment of the present invention. The apparatus (or circuit or device or integrated circuit) 100 may include a block (or circuit) 102, a block (or circuit) 104 and a block (or circuit) 106. The apparatus 100 may implement a serializer-deserializer (e.g., SerDes) apparatus. In a SerDes apparatus (or system), parallel data may be serialized in a transmitter (e.g., circuit 102), transferred as serial data on a communication channel (e.g., circuit 104) and subsequently deserialized in a receiver (e.g., circuit 106) back into the parallel data. The circuits 102-106 may represent modules and/or blocks that may be implemented as hardware, software, a combination of hardware and software, or other implementations. A signal (e.g., DK) may be received by the circuit 102. The signal DK may implement a data signal. A signal (e.g., DK') may be generated by the circuit 106. The signal DK' may carry recovered data.

The circuit 102 may implement a transceiver circuit. The circuit 102 is generally operation to generate signals carrying data to be communicated to the circuit 106. The data may be received in the signal DK. The circuit 102 may also be operational to receive signals carrying data received from the circuit 106. The signals may be communicated between the circuit 102 and the circuit 106 via the circuit 104. The circuit 102 may be fabricated as one or more integrated circuits.

The circuit 102 may participate in a transmitter adaptation to account for one or more characteristics of the circuit 104 (e.g., a channel pulse or impulse response). A filter within the circuit 102 may be initialized and subsequently adapted to the circuit 104 in parallel with an adaptation of one or more equalizers in the circuit 106. The adaptation generally involves adjusting one or more tap weight values of the filter. After the starting adaptation, the adaptation may be updated continuously using information generated in the circuit 106. The information may be based on an estimate of the channel characteristics to account for changing conditions in the circuit 104. In some embodiments, the filter may be implemented as a finite impulse response (e.g., FIR) filter. Other filters may be implemented to meet the criteria of a particular application.

The circuit 104 may implement a communication channel. The circuit 104 is generally operational carry the data communicated from the circuit 102 to the circuit 106. The circuit 104 may also carry data (e.g., the information) communicated from the circuit 106 to the circuit 102. The channel characteristics (e.g., channel pulse response characteristics) of the circuit 104 generally cause distortions in amplitude and/or phase of the data signals as the data signals propagate from one end of the circuit 104 to the other. The channel characteristics may also change over time and/or temperature. Implementations of the circuit 104 may include, but are not limited to, one or more transmission media such as air, wire, optical fibre, Ethernet and the like.

The circuit 106 may implement a transceiver circuit. The circuit 106 is generally operational to recover the data from the signals received from the circuit 102 via the circuit 104. The recovered data may be presented in the signal DK'. The circuit 106 may also be operational to send signals to the circuit 102 via the circuit 104. The circuit 106 may be fabricated as one or more integrated circuits.

The circuit 106 may include a receiver adaptation capability to account for the characteristics of the circuit 104. One or more equalizers within the circuit 106 may be initially adapted to the circuit 104 based on the data received from the circuit 102. The adaptation generally involves adjusting one or more tap weight values and/or programmable gain values of the equalizers. A converged adaptation may be considered as the estimate of the channel characteristics. Once the tap weight values have converged, the estimate may be stored. Thereafter, the receiver adaptation may be reset, restarted and performed repeatedly to account for changing conditions in the circuit 104.

The circuit 106 may include a transmitter adaptation capability to command adjustments in the circuit 102 to account for the changing characteristics of the circuit 104. The information based on the estimate may be generated in the circuit 106 and transferred back to the circuit 102. In some embodiments, the information may be transferred to the circuit 102 using a forward (or main) channel of the circuit 104. In some embodiments, the information may be transferred using a back channel of the circuit 104. After the initial adaptation, the receiver adaptation may be reset and restarted in parallel (or simultaneously) with the transmitter adaptation. In some embodiments, the equalizers may be implemented as a liner equalizer (e.g., LE) and a decision feedback equalizer (e.g., DFE). Other types and numbers of equalizers may be implemented to meet the criteria of a particular application.

Figure 3:
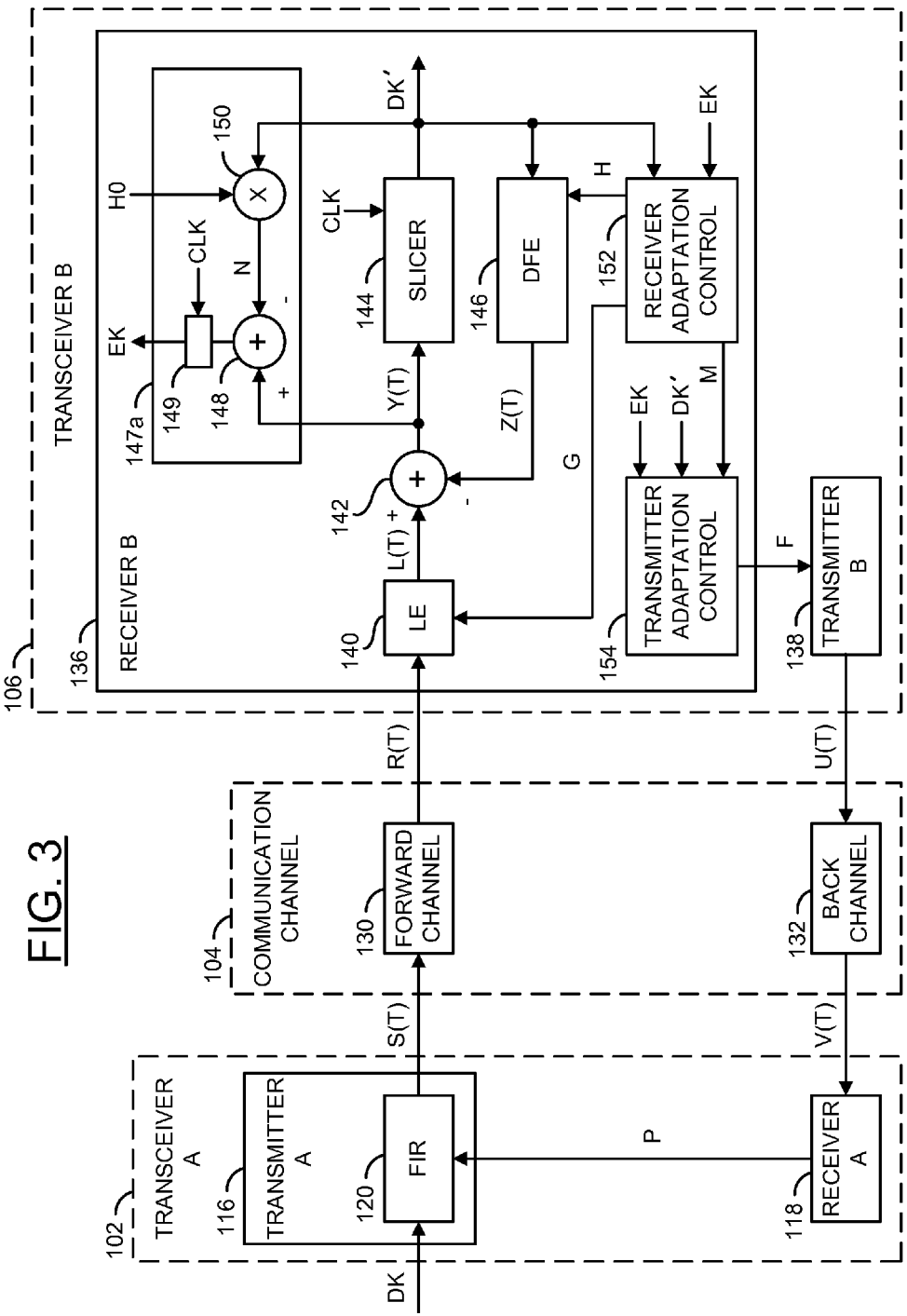
FIG. 3 is a detailed block diagram of an example implementation of the apparatus.

Referring to FIG. 3, a detailed block diagram of an example implementation of the apparatus 100 is shown. The circuit 102 generally comprises a block (or circuit) 116 and a block (or circuit) 118. The circuit 116 may include a block (or circuit) 120. The circuit 104 may include a block (or circuit) 130 and a block (or circuit) 132. The circuit 106 generally comprises a block (or circuit) 136 and a block (or circuit) 138. The circuit 136 may include a block (or circuit) 140, a block (or circuit) 142, a block (or circuit) 144, a block (or circuit) 146, a block (or circuit) 147a, a block (or circuit) 152 and a block (or circuit) 154. The circuit 147a generally comprises a block (or circuit) 148, a block (or circuit) 149 and a block (or circuit) 150. The circuits 116 to 154 may represent modules and/or blocks that may be implemented as hardware, software, a combination of hardware and software, or other implementations.

The signal DK may be received by the circuit 120. The circuit 120 may generate a signal (e.g., S(T)) transferred to the circuit 130. The signal S(T) may implement a send signal that carries the filter data from the signal DK. The signal S(T) may use any form of modulation suitable for the circuit 130. The circuit 130 may transfer a signal (e.g., R(T)) to the circuit 140. The signal R(T) may implement a receive signal. The signal R(T) is the signal S(T) after having traveled across the circuit 130.

A signal (e.g., L(T)) may be generated by the circuit 140 and presented to the circuit 142. The signal L(T) may implement a linear equalized signal created from the signal R(T).

The circuit 142 may generate a signal (e.g., Y(T)) that is received by the circuits 144 and 148. The signal Y(T) generally implements a corrected signal. The signal DK' may be generated by the circuit 144 and transferred to the circuits 146, 150, 152 and 154. In the absence of errors, the recovered data in the signal DK' may match the original data in the signal DK. The circuit 146 may generate a signal (e.g., Z(T)) used by the circuit 142. The signal Z(T) may convey correction data used to correct the linear equalized data in the signal L(T). A signal (e.g., N) may be generated by the circuit 150. The signal N may carry a normalized version of the recovered data in the signal DK'. The circuit 148 may generate a signal (e.g., EK). The signal EK may be buffered in the circuit 149 and subsequently transferred to the circuits 152 and 154. The signal EK may implement an error signal. A signal (e.g., H) may be generated by the circuit 152 and presented to the circuit 146. The signal H may be a coefficient signal that carries multiple tap weights for the circuit 146. A particular tap weight (e.g., $H_0$) may be presented by the circuit 152 to the circuit 150 in a signal (e.g., H0). The circuit 152 may also generate a signal (e.g., G) transferred to the circuit 140. The signal G may convey gain information. A signal (e.g., M) may be generated by the circuit 152 and transferred to the circuit 154. The signal M may carry tap weight coefficients. The circuit 154 may generate a signal (e.g., F). The signal F may be transferred to the circuit 138. The signal F may be a control signal that carries the information used for back channel adaptation of the circuit 120. The signal F may convey information defining at least three states (e.g., up, down and do nothing). A signal (e.g., CLK) may be received by the circuits 144 and 149. The signal CLK may implement a clock signal.

A signal (e.g., U(T)) may be generated by the circuit 138 and transmitted through a back channel (e.g., the circuit 132) of the circuit 104 to the circuit 118. The signal U(T) may carry the information used to adapt the circuit 120. The signal U(T) may use any form of modulation suitable for the circuit 132. A signal (e.g., V(T)) may be received by the circuit 118 from the circuit 132. The signal V(T) is the signal U(T) after having traveled across the circuit 132. A signal (e.g., P) may be generated by the circuit 118 and received by the circuit 120. The signal P generally carries the information received by the circuit 118 through the signal V(T).

The circuit 116 may implement a transmitter circuit. The circuit 116 is generally operational to generate the signal S(T) from the data received in the signal DK. The signal S(T) may be transmitted in the circuit 130. The circuit 116 may also be operational to filter the received data to account for the characteristics of the circuit 130.

The circuit 118 may implement a receiver circuit. The circuit 118 is generally operational to receive the information via the signal V(T) from the circuit 132. The circuit 118 may also be operational to convert the information from the format of the signal V(T) to that of the signal P. The reformatted information may be transferred to the circuit 120 in the signal P. In some embodiments, the circuit 118 may have a design similar to that of the circuit 136. In other embodiments, the circuit 118 may have a different design than the circuit 136.

The circuit 120 may implement a FIR filter circuit. The circuit 120 is generally operational to generate the signal S(T) by filtering the signal DK. Filtering characteristics of the circuit 120 are generally based on one or more tap weights. The filtering may be enabled at some times and disabled at other times. In some embodiments, the tap weights may include one or more precursor tap weights (e.g., $C_{-1}$ and $C_{-2}$), a peak tap weight (e.g., $C_0$) and one or more post-cursor tap weights (e.g., $C_1$ and $C_2$). Other numbers of tap weights may be implemented to meet the criteria of a particular application. Control to increase, decrease and/or maintain the tap weight values may be provided by the signal P.

The circuit 130 may implement a forward channel in the circuit 104. The circuit 130 may be operational to convey data transmitted from the circuit 102 to the circuit 106. The circuit 130 has the channel characteristics to which the circuits 102 and 106 may be adapted.

The circuit 132 may implement a back channel in the circuit 104. The circuit 132 may be operational to convey data transmitted from the circuit 106 to the circuit 102. In some embodiments, the circuit 132 may utilize part of a bandwidth of the circuit 104. In other embodiments, the circuit 132 may utilize a separate medium than the circuit 130.

The circuit 136 may implement a receiver circuit. The circuit 136 is generally operational to detect and recover the data received in the signal R(T) and present the recovered data in the signal DK'. The circuit 136 may also be operational to adapt the detection circuitry to the channel characteristics of the circuit 130. The circuit 136 may be further operational to generate the information used to adapt the circuit 120 to the channel characteristics of the circuit 130.

The circuit 138 may implement a transmitter circuit. The circuit 138 is generally operational to transmit the information received in the signal F (and/or other data) in the signal U(T) to the circuit 132. In some embodiments, the circuit 138 may have a design similar to that of the circuit 116. In other embodiments, the circuit 138 may have a different design than the circuit 116.

The circuit 140 may implement a linear equalizer circuit. The circuit 140 is generally operational to adjust a gain of the data received in the signal R(T). The circuit 140 may include an adjustable pole to aid in reducing inter-symbol interference within the signal R(T). The equalized data may be presented in the signal L(T).

The circuit 142 may implement a subtraction circuit. The circuit 142 may be operational to generate corrected data by subtracting the correction data in the signal Z(T) from the equalized data in the signal L(T). The corrected data may be presented in the signal Y(T).

The circuit 144 may implement a slicer circuit. The circuit 144 is generally operational to generate the recovered data by quantifying the corrected data received in the signal Y(T). The recovered data may be presented in the signal DK'.

The circuit 146 generally implements a decision feedback equalizer (e.g., DFE) circuit. The circuit 146 may be operational to generate the correction data by adjusting the recovered data received in the signal DK'. The adjusting may be controlled by one or more tap weight values controlled through the signal H. In some embodiments, the tap weights may include one or more precursor tap weights (e.g., $H_{-1}$ and $H_{-2}$), a peak tap weight (e.g., $H_0$) and one or more post-cursor tap weights (e.g., $H_1$ and $H_2$). Other numbers of tap weights may be implemented to meet the criteria of a particular application.

The circuit 147a may implement an error generating circuit. The circuit 147a is generally operational to generate the signal EK. The error may be based on a difference between the signal Y(T) and a normalized version of the signal DK'.

The circuit 148 may implement a subtractor circuit. The circuit 148 is generally operational to generate error data in the signal EK by subtracting the normalized data in the signal N from the corrected data in the signal Y(T).

The circuit 149 may implement a register circuit. The circuit 149 may be operational to buffer (or register) the error data generated by the circuit 148. The buffered error data may be presented in the signal EK.

The circuit 150 may implement a multiplication circuit. The circuit 150 generally multiplies the recovered data in the signal DK' by the tap weight coefficient $H_0$ to create the normalized data. The normalized data is generally presented to the circuit 148 in the signal N.

The circuit 152 may implement a receiver adaptation control circuit. The circuit 152 is generally operational to adapt the circuits 140 and 146 to the channel characteristics of the circuit 104 based on data received in the signals EK and DK'. Adaptation of the circuit 146 may be controlled by calculating tap weight coefficients in the signal H. Adaptation of the circuit 140 may be controlled by generating a gain value and a pole value in the signal G. The circuit 152 may also control the normalization of the recovered data by calculating the tap weight coefficient $H_0$. Furthermore, the signal M may be generated by the circuit 152 based on the signals EK and DK' to control the adaptation of the circuit 120. In some embodiments, the signal M may convey a normalized code than thus may be different than the original code in the signal H.

The circuit 154 may implement a transmitter adaptation control circuit. The circuit 154 is generally operational to generate the information in the signal F as feedback for the transmitter adaptation of the circuit 120. The circuit 154 may implement a transmitter adaptation process. The circuit 154 may use the tap weight coefficients $H_i$ (where i=−2, −1, 0, 1, 2) in the signal M as an estimation (or approximation) of the channel characteristics (e.g., channel pulse response $F_n$) of the circuit 130. The circuit 154 may also use the error information in the signal. EK and the recovered data in the signal DK' to generate the signal F. The circuit 154 may present change information for each coefficient in the signal F. Each change information may cause the circuit 120 to increase (e.g., increment up), decrease (e.g., decrement down) or not change the corresponding tap weight values for the circuit 120. The adjustments may adapt the center of the pulse data to the circuits 130 and 140. The adjustments may adapt the circuit 120 to equalize the transmitted signal S(T) such that the ISI at the eye center is minimized. The adjustments may also adapt the circuit 120 to equalize the transmitted signal S(T) such that the ISI at the data transitions is minimized.

In some embodiments, the circuit 136 may pass the information to a protocol stack which uses the circuit 138 to send the information through the circuit 132 to the circuit 118. The circuit 118 may pass the information to another protocol stack and eventually to the circuit 116.

A gradient used to adjust the tap weights of the circuit 120 should be based on the channel characteristics of a link that includes the circuit 130, the circuit 140 and anything else before the circuit 142. For example, the gradient for the coefficient $C_1$ may be given by equation 1 as follows:

$$\text{gradient } C_1 = \\ \text{sign}(E_k) \times \text{sign}(\ldots + F_0 \times D_{(k-1)} + F_1 \times D_{(k-1-1)} + \ldots + \\ F_4 \times D_{(k-4-1)} + \ldots ) \quad \text{Eq. (1)}$$

Where $F_n$ may represent the channel pulse response values of the link.

Common adaptation techniques that do not use the channel pulse response values $F_n$ commonly results in inferior performance, and in most case, create coupling between the receiver (e.g., LE/DFE) adaptation and the transmitter (e.g., FIR) adaptation. The performance becomes limited when the tap weight values for the circuit 146 adapt faster and finish ahead of the adaptation for the circuit 120. Since the gradients for the coefficients come close to zero, the tap weight values for the circuit 120 stop adapting. Therefore, the adapted settings for the circuit 120 are left at improper values.

In some embodiments of the present invention, a number of terms used in the gradients may be limited to reduce an implementation cost. Furthermore, the tap weights (or coefficients) $H_i$ for the circuit 146 are generally considered good estimates of the channel pulse response of the circuit 104. Since the tap weights $H_i$ are adapted anyway, using the tap weights $H_i$ generally eliminates the implementations of separate channel estimation circuits. Additionally, the circuit 120 may be disabled during an initial adaptation of the circuits 140 and 146 to remove the interference from the FIR filter (e.g., circuit 120).

Figure 4:
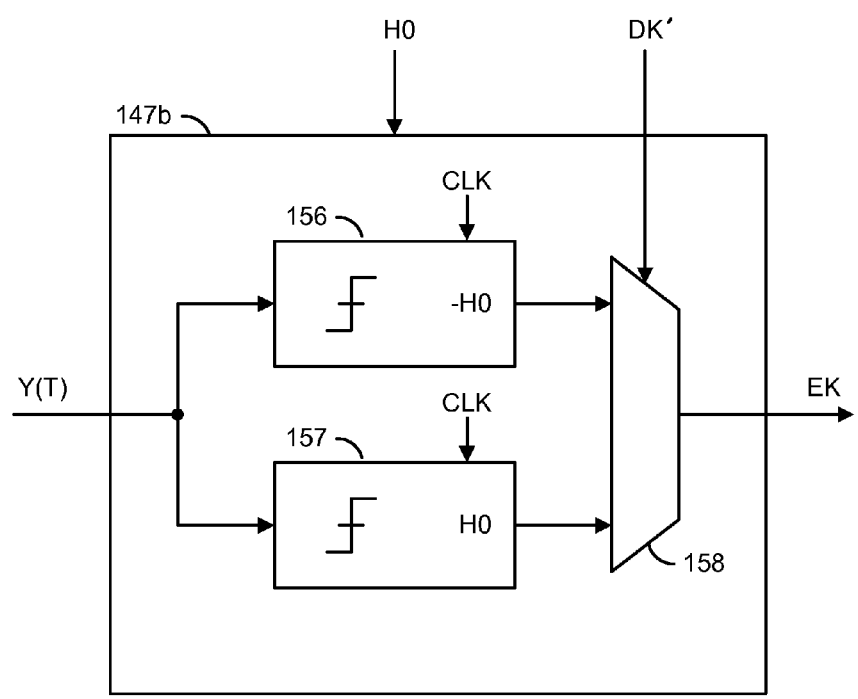
FIG. 4 is a block diagram of an example embodiment of an error generating circuit.

Referring to FIG. 4, a block diagram of an example embodiment of an error generating circuit 147b is shown. The circuit 147b may replace the circuit 147a in some designs of the circuit 136. The circuit 147b generally comprises a block (or circuit) 156, a block (or circuit) 157, and a block (or circuit) 158. The circuits 147b and 156 to 158 may represent modules and/or blocks that may be implemented as hardware, software, a combination of hardware and software, or other implementations.

The circuit 156 may be implemented as a capture latch triggered by the signal CLK. The circuit 157 may be implemented as a capture latch triggered by the signal CLK. The circuit 158 may be implemented as a multiplexer. The circuits 156 and 157 may have crossing latch thresholds of −H0 and H0, respectively, where H0 represents a target level of the receiver circuit containing the circuit 147b.

The signal Y(T) may be presented to an input of the circuit 156 and an input of the circuit 157. An output of the circuit 156 may be presented to an input of the circuit 158. An output of the circuit 157 may be presented to another input of the circuit 158. A control input of the circuit 158 may receive the signal DK' from the circuit 144. The circuit 158 may have an output that may present the signal EK.

Figure 5:
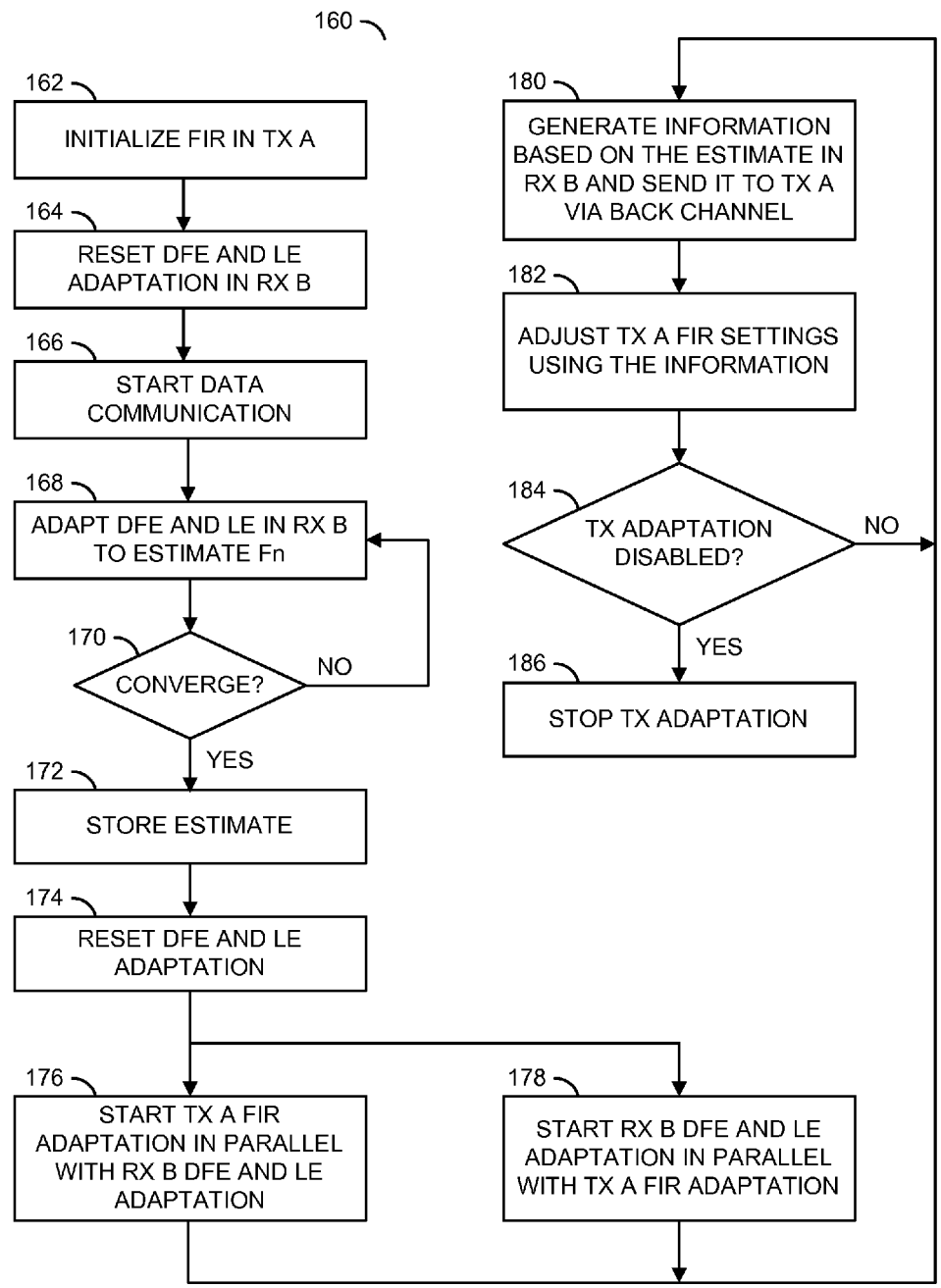
FIG. 5 is a flow diagram of an example method for back channel adaptation using a channel pulse response.

Referring to FIG. 5, a flow diagram of an example method 160 for back channel adaptation using a channel pulse response is shown. The method (or process) 160 may be implemented by the apparatus 100. The method 160 generally comprises a step (or state) 162, a step (or state) 164, a step (or state) 166, a step (or state) 168, a step (or state) 170, a step (or state) 172, a step (or state) 174, a step (or state) 176, a step (or state) 178, a step (or state) 180, a step (or state) 182, a step (or state) 184 and a step (or state) 186. The steps 162-186 may represent modules and/or blocks that may be implemented as hardware, software, a combination of hardware and software, or other implementations.

In the step 162, the circuit 120 may be initialized. The circuit 136 may reset an adaptation of the circuits 140 and 144 in the step 164. The circuit 116 may start transmitting data to the circuit 136 via the circuit 130 in the step 166. In the step 168, the circuit 136 may begin adaptation of the circuits 140 and 144 to the received data in the signal R(T). A convergence test may be performed by the circuit 152 in the step 170. If the tap weight coefficients, gain and pole values have not converged, the adaptation may continue with the step 168. Once the tap weight coefficients, gain and pole values have converged, the circuit 152 may store the converged values as the estimate in the step 172. The adaptation of the circuits 140 and 144 may be reset in the step 174.

In the steps 176 and 178, the circuits 152 and 154 may start the transmitter (FIR) adaptation in parallel with the receiver (LE/DFE) adaptation, respectively. In the step 180, the circuit 154 may generate the information for the transmitter adaptation and send the information to the circuit 120 via the circuits 138, 132 and 118. The transmitter adaptation may include the circuit 154 sending up/down/no change information for each tap weight coefficient of the circuit 120. The circuit 116 may adjust the settings for the circuit 120 using the information in the step 182.

While the transmitter adaptation in the circuit 116 is enabled per the step 184, the circuits 152 and 154 may continuously update the adaptations to account for any changes that may occur in the circuit 130. If the transmitter adaptation is disabled, the circuit 116 may stop the transmitter adaptation in the step 186.

The transmitter adaptation of the circuit 120 is generally based on the gradients of the tap weight coefficients. For example, tap weight coefficient $C_1$ may be adapted using the gradient of equation 2 as follows:

$$\text{gradient } C_1 = \text{sign}(E_k) \times \text{sign}(H_0 * D_{(k-1)} + H_1 \times D_{(k-1-1)} + \ldots + H_4 \times D_{(k-4-1)}) \qquad \text{Eq. (2)}$$

In equation 2, the actual voltage of the DFE tap weight may be utilized. However, the voltage levels may be obtained based on equation 3 as follows:

$$H_i = (\text{code of } H_i) \times (\text{step size}), \text{for } i=0\text{-}4 \qquad \text{Eq. (3)}$$

The "code of $H_i$" may be a predetermined voltage (or constant value). When all of the DFE tap weights have the same step size, the DFE tap weights may be replaced by corresponding digital codes without causing a sign change. Similarly, if a given step size is different from another step size by an integer amount, the given step size may also be left out of the equations. For example, if the step size of the coefficients $H_0$ and $H_1$ is twice that of the rest of the taps, the other tap weights may be replaced with the corresponding codes, $H_0$ may be replaced with a $2 \times H_0$ code and $H_1$ may be replaced with a $2 \times H_1$ code.

When the step size is arbitrary, the coding scheme for the coefficients may minimize the number of bits used to represent the coefficients. An approximation for each coefficient may also be made by rounding up the code to the nearest integer to reduce the number of bits of an adder.

The error signal EK may be obtained by (i) comparing the corrected signal Y(T) with a target level in the signal N in the circuit 147a or (ii) by using the crossing sampling in the circuit 147b. The error signal EK obtained by comparing generally leads to a center equalized tap weight for the circuit 120. The error signal EK obtained using the crossing sampling may cause the tap weight of the circuit 120 to converge on a setting that minimizes jitter.

The back channel adaptation may utilize the following theorem. If the input to a system is Xk and a sampling rate is 1/T, the sampled output Wk may be a convolution of Xk and the sampled pulse response of the system Pk (e.g., Wk=Xk× Pk), where Pk is obtained by sampling the pulse response at the rate of 1/T. The input may be expressed as $$\sum_{i=-\infty}^{\infty} Xi \times G(t - i \times T),$$

where G(t) is 1 for $0 \leq t \leq T$ and 0 otherwise. For each pulse G(t) at the input to the system, the corresponding output W(t) may be the pulse response of the system p(t). Consequently, the output may be expressed by equation 4 as follows:

$$W(t) = \sum_{i=-\infty}^{\infty} Xi \times p(t - i \times T) \quad \text{Eq. (4)}$$

Sampling at the rate of 1/T, the sampled output may be expressed by equation 5 as follows:

$$\begin{aligned}Wk &= W(k \times T) \\ &= \sum_{i=-\infty}^{\infty} Xi \times p(k \times T - i \times T) \\ &= \sum_{i=-\infty}^{\infty} Xi \times P(k - i) \\ &= Xk \otimes Pk\end{aligned} \quad \text{Eq. (5)}$$

To find a technique to adapt the tap weights of the circuit 120 via the back channel 132, a model is generally used, for example, as shown in FIG. 3. The model generally includes the functional blocks corresponding to the back channel adaptation. Going by the model and equation 5, the input to the slicer may be expressed by equation 6 as follows:

$$Y_k = \sum_{n=-\infty}^{\infty} F_n \times \left( \sum_{l=L1}^{L2} C_l \times D_{(k-n-1)} \right) - \sum_{i=1}^{M} H_i \times D'_{(k-i)} \quad \text{Eq. (6)}$$

Where (i) $F_n$ may be the combined pulse response of the circuit 130 and the circuit 140, (ii) $C_1$ is a tap weight of the circuit 120 and (iii) the parameters L1 and L2 are the lower and upper bounds of the tap positions. In some embodiments, L1=−2 and L2=1. Other values of the parameters L1 and L2 may be implemented to meet the criteria of a particular application.

The error values in the signal EK are generally the same as that of the DFE loop per equation 7 as follows:

$$E_k = Y_K - H_0 \times D_k' \quad \text{Eq. (7)}$$

By differentiating the mean squared error in regard to $C_1$, a corresponding least mean square (e.g., LMS) gradient for tap 1 may be expressed by equation 8 as follows:

$$\text{LMS gradient} = \text{sign}(E_k) \times \text{sign}\left( \sum_{n=-\infty}^{\infty} F_n \times D_{(k-n-1)} \right) \quad \text{Eq. (8)}$$

In some embodiments, the parameter 1 may be (i) 1 for the first post-cursor tap, (ii) −1 for the first precursor tap and (iii) −2 for the second precursor tap. Other values may be implemented to meet the criteria of a particular application. Assuming error-free operation, the least mean square gradient used at the receiver may be expressed by equation 9 as follows:

$$\text{LMS gradient} = \text{sign}(E_k) \times \text{sign}\left( \sum_{n=-\infty}^{\infty} F_n \times D'_{(k-n-1)} \right) \quad \text{Eq. (9)}$$

Due to implementation constraints, only a finite number of decisions are generally used. Thus, equation 9 may be approximated by equation 10 as follows:

$$\text{LMS gradient} = \text{sign}(E_k) \times \text{sign}\left( \sum_{n=N1}^{N2} F_n \times D'_{(k-n-1)} \right) \quad \text{Eq. (10)}$$

Where N1 may be a predetermined lower value and N2 a predetermined upper value. In some embodiments, N1=−1 and N2=4. Other values may be implemented to meet the criteria of a particular application.

The pulse response of the combined circuit 130 and 140 is often not known. However, the DFE tap weight $H_n$ may be a good estimate of the pulse response of the combined circuits 120, 130 and 140 at time nT. Therefore, equation 10 may be simplified as equation 11 as follows:

$$\text{LMS gradient} = \text{sign}(E_k) \times \text{sign}\left( \sum_{n=N1}^{N2} H_n \times D'_{(k-n-1)} \right) \quad \text{Eq. (11)}$$

Here $H_n$ may be the DFE tap weight when the circuit 120 is not enabled. Thus, the tap weight $H_n$ may be a good estimate of the pulse response of the combined circuits 130 and 140 at time nT. While determining the tap weight $H_{-1}$ may be possible (the precursor generally serves as the feedback for virtual $H_{-1}$ tap), implementation is simpler if N1≥0.

The implementation may be further simplified by normalizing the channel pulse response (e.g., $F_n$=1). Therefore, equation 11 may be simplified to equation 12 as follows:

$$\text{LMS gradient} = \text{sign}(E_k) \times \text{sign}\left( \sum_{n=N1}^{N2} D'_{(k-n-1)} \right) \quad \text{Eq. (12)}$$

Another simplification of the implementation may be to adapt the main cursor based on a variable gain amplifier setting (e.g., within the circuit 140) rather than using the adaptation technique above, thus eliminating the loop filter.

Consider the following case in which there are a fixed number of FIR taps (e.g., $C_{-2}$, $C_{-1}$, $C_0$ and $C_1$). For each FIR tap, an up or down decision may be generated by the circuit 154 and sent via the back channel 132 to the circuit 120 to adjust the corresponding tap weight for the circuit 120. An initial part of the processing may be to filter input data received in the signal R(T) with the circuit 140. The filtered data may be sent to the loop filter together with the error signals. In some embodiments, the loop filter may be similar to that of common loops to reuse existing designs and to simplify test and maintenance.

The data filter generally emulates the combined filter of the circuits 130 and 140. The data filter may be expressed by equation 13 as follows:

$$\text{Filter} = \text{sign}\left( \sum_{n=N1}^{N2} H_n \times D'_{(k-n-1)} \right) \quad \text{Eq. (13)}$$

Two options may be available. A default option may be to use the DFE tap weights $H_n$ as the channel pulse response $F_n$, where $H_n$ is obtained when the circuit 120 is not enabled. The converged DFE tap weights should be frozen after back channel adaptation starts, although the DFE tap weights used by the circuit 146 may continue to be adapted.

Since each DFE tap weight may have a different step size, normalization is generally done to ensure that the digital code of $H_n$ is proportional to the actual voltage level. The step size of each tap weight and the corresponding normalization formula, which basically converts an original code to the voltage level in integers based on the step size, may be summarized in Table I.

TABLE I

| DFE Tap Weight | Step Size (mV) | No. of Bits of the Original Code | Normalization Formula | No. of Bits After Normalization |
|---|---|---|---|---|
| $H_0$ | 3 | 6 | (3 × Code) + 60 | 8 |
| $H_1$ | 4 | 5 | 4 × Code | 7 |
| $H_2$ | 4.5 | 5 | sign(Code) × (4 × Code + floor(0.5 × code)) | 8 |
| $H_3$ | 4 | 4 | sign(Code) × 4 × Code | 6 |
| $H_4$ | 4 | 4 | sign(Code) × 4 × Code | 6 |

The tap weight $H_2$ may be the only tap weight that has a fine (e.g., 0.5 millivolt (mV)) precision. To reduce the number of bits that represent the code after normalization, the code for $H_2$ may be rounded up to a largest integer no larger than the code. In Table I, a maximum number of bits that represent any DFE tap weight code may be 8 (e.g., for tap weight $H_2$). The codes may be used as $H_n$ in equation 13. Therefore, a multi-bit adder (e.g., 8-bit) may be used for each data filter.

Each codes is generally based on (a) a code of a corresponding one of the decision feedback equalizer tap weights generated by the circuit 152, (b) a step size of the corresponding decision feedback equalizer tap and (c) a tap position of the corresponding decision feedback equalizer tap. The original code may be the code of the DFE tap weight used by the receiver adaptation (e.g., circuit 152).

The other option may be to add up the data bits. The addition may be similar to setting the tap weight $H_n$ to 1 (one). The values of N1 and N2 may be slightly different between the two options and are summarized in Table II.

TABLE II

|  | $H_n \neq 1$ | $H_n = 1$ |
|---|---|---|
| N1 | 0 | −1 |
| N2 | 4 | 3 |

Figure 6:
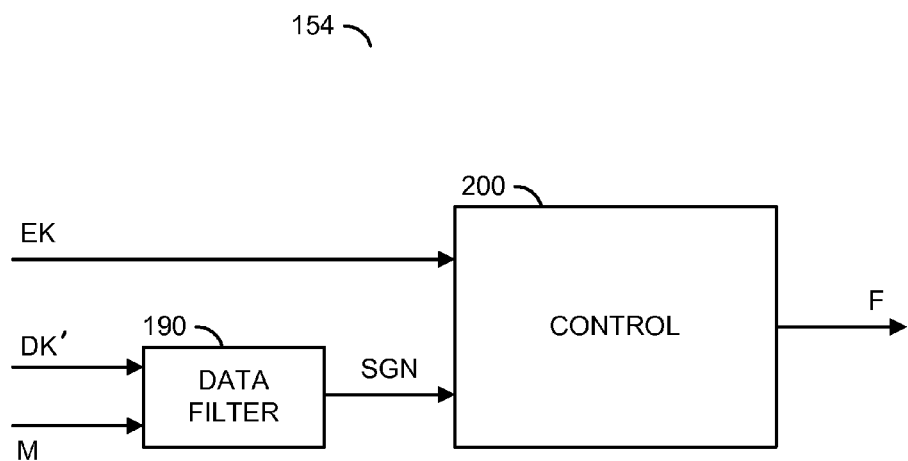
FIG. 6 is a detailed block diagram of an example implementation of a transmitter adaptation control circuit.

Referring to FIG. 6, a detailed block diagram of an example implementation of the circuit 154 is shown. The circuit 154 generally comprises a block (or circuit) 190 and a block (or circuit) 200. The circuits 190-200 may represent modules and/or blocks that may be implemented as hardware, software, a combination of hardware and software, or other implementations.

The signals DK' and M may be received by the circuit 190. The signal EK may be received by the circuit 200. A signal (e.g., SGN) may be generated by the circuit 190 and presented to the circuit 200. The signal SGN may convey sign information. The signal F may be generated by the circuit 200.

The circuit 190 may implement a data filter circuit. The circuit 190 is generally operational to calculate sign samples for the recovered data in the signal DK' based on the tap weights in the signal M. The circuit 190 generally multiplies sequential recovered data values by corresponding tap weights, sums the resulting products and calculates the sign samples.

The circuit 200 may implement a control circuit. The circuit 200 is generally operational to control the adaptation of transmitter (e.g., the circuit 120). The adaptation may be based on the error data received in the signal EK from the circuit 148 and the sign samples received in the signal SGN from the circuit 190.

Figure 7:
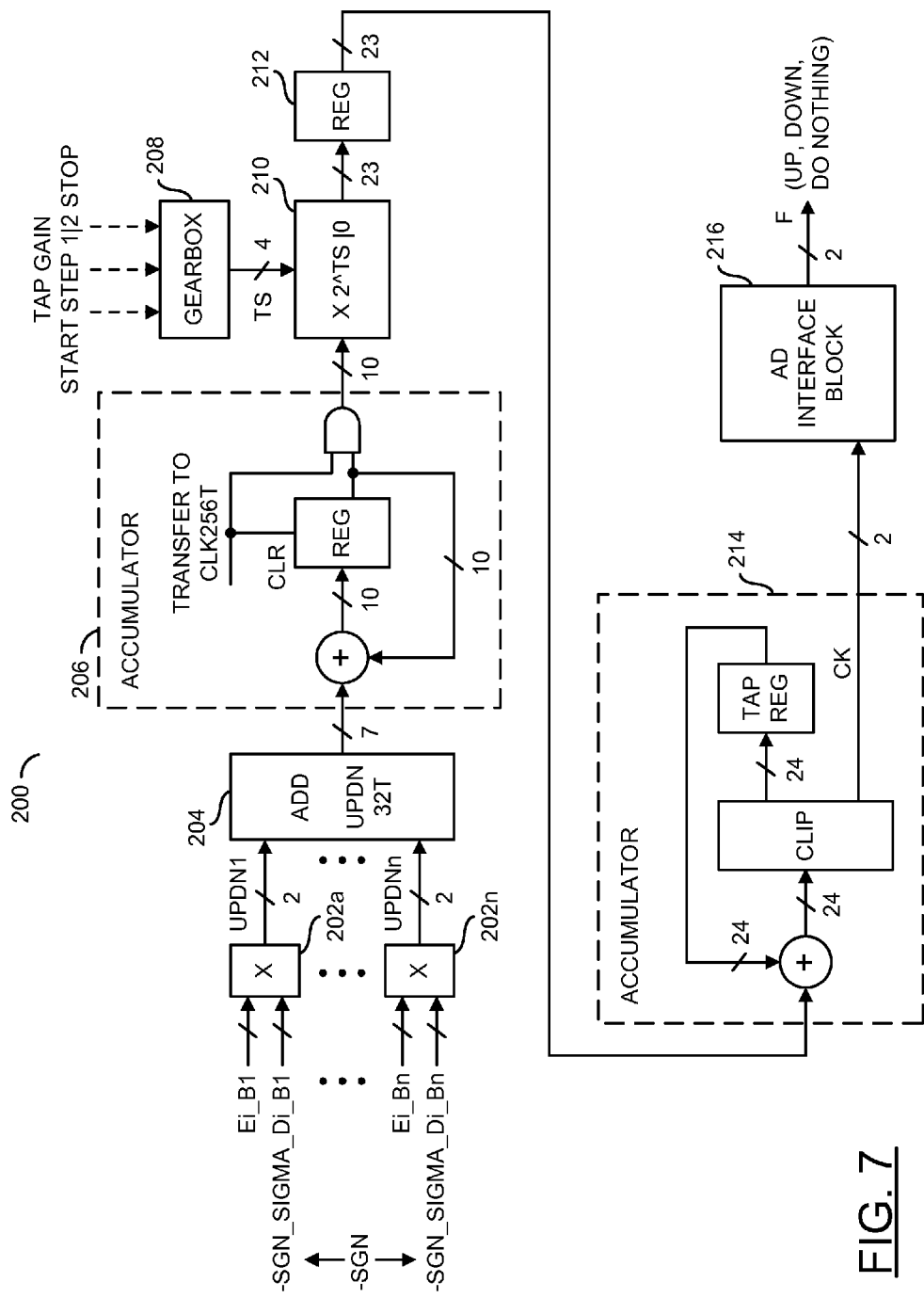
FIG. 7 is a block diagram of an example implementation of a loop filter circuit.

Referring to FIG. 7, a block diagram of an example implementation of the circuit 200 is shown. The circuit 200 generally comprises multiple blocks (or circuits) 202a-202n, a block (or circuit) 204, a block (or circuit) 206, a block (or circuit) 208, a block (or circuit) 210, a block (or circuit) 212, a block (or circuit) 214 and a block (or circuit) 216. The circuits 202a-216 may represent modules and/or blocks that may be implemented as hardware, software, a combination of hardware and software, or other implementations.

The circuit 200 may initially calculate a gradient of the values received in the signal SGN. The signal SGN may comprise multiple components (e.g., −sgn_sigma_Di_Bi, . . . , −sgn_sigma_Di_Bn). A negative sign (or negative symbol) is generally used before the −sgn_sigma_Di_Bi terms, which is different from a typical DFE loop filter. In addition, Di, instead of −sgn_sigma_Di_Bi, may be used to check if Ei is valid. Since multiple (e.g., 4) loops may be implemented, with multiple (e.g., 32) gradients in each loop, computing many (e.g., 4×32=128) gradients within a 32T period is generally a demanding task, especially if an 8-bit adder is utilized for each gradient. However, a fewer number of the gradients (e.g., only 35 gradients=32 plus 2 precursors and 1 post cursor) out of the many gradients may be unique. As a result, each loop may not have dedicated 32 gradient creation blocks. Instead, a correct set of 32 gradients out of the total 35 gradients may be computed and dispatched to every loop, which helps to save an area of the circuitry by approximately 73%.

Each circuit 202a-202n may implement a multiplication circuit. The circuits 202a-202n are generally operational to multiply a number of samples of the error signal EK (e.g., Ei_B1, . . . , Ei_Bn) by corresponding sign samples generated by the circuit 190 (e.g., −SGN_SIGMA_Di_B2, . . . , −SGN_SIGMA_Di_B1). In some embodiments, pairs of the signals Ei_B1 to Ei_Bn and −SGN_SIGMA_Di_B1 to −SGN_SIGMA_Di_Bn may be presented to inputs of the circuits 202a-202n. In general, the inputs to the multipliers 202a-202n may be any bit width. The products of the signal pairs (e.g., UPDN1-UPDNn) may be presented to the circuit 204.

To eliminate a reliance on the data bits that are not yet available, Ei may be shifted earlier by several (e.g., 3) bits for the second precursor loop, with N1 being −1. For consistency, all of the loops generally use the same set of error signals, which include the last three error signals from the previous 32T period, no matter what option is used to filter the data. For each loop, −sgn_sigma_Di_Bi may be aligned correctly with the set of error signals.

The circuit 204 may implement an n-bit adder circuit. The circuit 204 is generally operational to sum the signal pairs UPDN1-UPDNn. The signal pairs UPDN1-UPDNn may form a set of n gradients. A 32T latency generally exists between the inputs and the output. An output of the circuit 204 may be presented to the circuit 206.

The circuit 206 may implement an accumulator circuit. The circuit 206 is generally operational to accumulate multiple (e.g., 256) gradients in a 256T period, effectively slowing down the circuits from a 32T cycle to a 256T cycle. Several (e.g., 14) bandwidth settings may be available to shift the output of the multi-bit (e.g., 10-bit) accumulator leftward (e.g., from 0 to 13 bits). The data may be presented to the circuit 210.

The circuit 208 may implement a gearbox circuit. The circuit is generally operational to generate a signal (e.g., TS) that conveys a tap gain. The gearbox shifting generally decreases the tap gain at a constant pace, which helps to speed up the back channel adaptation without sacrificing the performance. The signal TS may be transferred to the circuit 210.

The circuit 210 may implement a multiplication circuit. The circuit 210 may multiply the summed value received from the circuit 206 by a value (e.g., 2^TS). The result may be stored in the circuit 212 (e.g., a register).

The circuit 214 may implement an accumulator circuit. The circuit 214 may be operational to accumulate the data received from the circuit 212. The data in the TAP register may be coded in 2's complement.

The circuit 216 may implement an adaptation decision (e.g., AD) interface circuit. The circuit 216 is generally operational to generate the signal F. The signal F may convey an up indication, a down indication or a do-nothing indication for use in adjusting the tap weights of the circuit 120. The coding may be a binary "01" if the TAP register clips on a ceiling, a binary "10" if the TAP register clips on a floor-1 and a binary "00" otherwise.

A difference between the circuit 200 and that of a common DFE loop is that the circuit 200 generally produces up/down signals instead of actual tap weight value. To do so, a single extra bit is generally allowed for the accumulator in the final stage (e.g., the circuit 214). The input to the circuit 214 may have up to several (e.g., 23) bits, so the accumulation should produce a larger value (e.g., up to 24 bits). Only if the accumulator clips, an up indication or a down indication may be sent via the back channel 132 to the circuit 120 to increase or decrease the voltage level of the corresponding tap weight. Otherwise, no change is indicated (e.g., binary value "00"). The clipping function is generally such that if the sum is more than a predetermined upper value (e.g., $2^{23}-1$), the content of the accumulator may be set to the predetermined upper value. If the sum is less than a predetermined lower value (e.g., $-2^{23}$), the content of the accumulator may be set to approximately the predetermined lower value (e.g., $-(2^{23}-1)$). Since the content of the circuit 214 may be represented in a 2's compliment format, either $-2^{23}$ or $-(2^{23}-1)$ are possible values of the accumulator. If the sign of the accumulator is 1 when clipping happens, an up indication (e.g., binary value "01") may be sent. If the sign is −1 when the clipping happens, a down indication (e.g., binary value "10") may be sent. The up/down indication is generally stored in a register within the circuit 216 and is 256T ahead of the change of the accumulator content.

Operation of the circuit 200 may be considered as a DFE loop of a bipolar tap weight with four possible DFE tap weight settings (e.g., 00, 01, 10, 11). A difference is that the up setting or the down setting is a change of a tap weight value, rather than an actual tap weight value. Consequently, the up indication or the down indication may be produced only if the accumulator clips.

Some embodiments of the present invention generally use a channel pulse response to adapt the transmit tap weights, which helps to obtain better settings compared with conventional adaptation techniques. The adaptation based on the channel pulse response may reduce a coupling between the DFE and transmitter loops. Use of the DFE tap weights to estimate the channel pulse response may also help bring down the implementation cost of the channel estimation. By carefully choosing the step sizes of the DFE tap weights, the implementation of the FIR adaptation may be simplified. In cases where a DFE tap weight step size is binary multiples of another DFE tap weight step size, the described coding scheme generally helps to reduce the size of the coefficients and the adder. Furthermore, the adaptation may either center equalized or edge equalized the pulse response.

Figure 8:
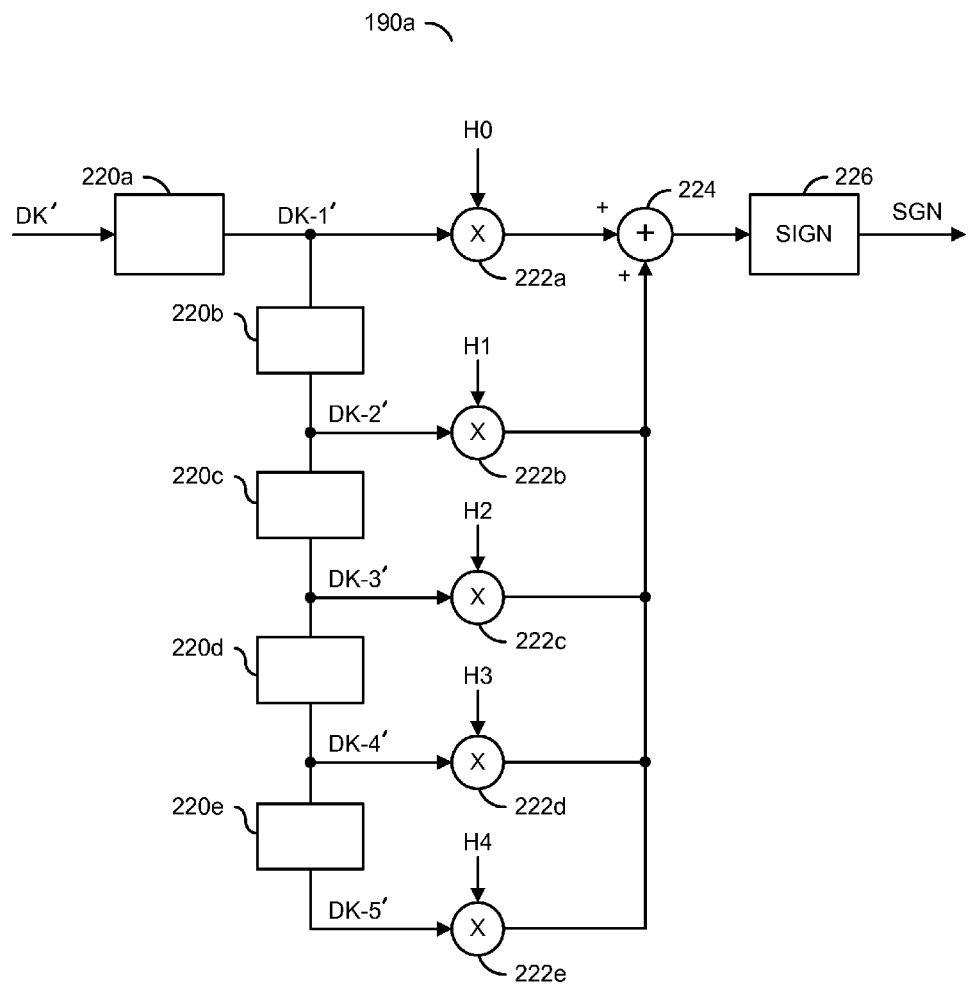
FIG. 8 is a block diagram of an example implementation of a data filter circuit.

Referring to FIG. 8, a block diagram of an example implementation of a circuit 190a is shown. The circuit 190a may be an embodiment of the circuit 190. The circuit 190a generally comprises multiple blocks (or circuit) 220a-220e, multiple blocks (or circuits) 222a-222e, a block (or circuit) 224 and a block (or circuit) 226. The circuits 220a-226 may represent modules and/or blocks that may be implemented as hardware, software, a combination of hardware and software, or other implementations. The signal DK' may be received by the circuit 220a. The circuit 226 may generate the signal SGN.

Each circuit 220a-220e may implement a register circuit. The circuits 220a-220e may be connected sequentially such that consecutive recovered data values (e.g., 5 consecutive values $D_{(K-1)}$ to $D_{(K-5)}$) may be shifted from the circuit 220a to the circuit 220e. Each circuit 220a-220e may generate a corresponding output in a signal (e.g., DK−1' to DK−5') transferred to the circuits 222a-222e.

Each circuit 222a-222e may implement a multiplication circuit. The circuits 222a-222e are generally operational to multiply the recovered data value received from the corresponding circuit 220a-220e by a respective weight tap value (e.g., $H_0$-$H_4$). The weight tap values may be received as components (e.g., H0-H4) of the signal M. Each product calculated by the circuits 222a-222e may be presented to the circuit 224.

The circuit 224 may implement an adder circuit. The circuit 224 is generally operational to add (or calculate a sum of) the product values generated by the circuit 222a-222e. A sum value may be presented to the circuit 226.

The circuit 226 may implement a sign calculation circuit. The circuit 226 is generally operational to calculate the sign samples for the sum values received from the circuit 224. The sign samples may be presented to the circuit 200 in the signal SGN.

Figure 9:
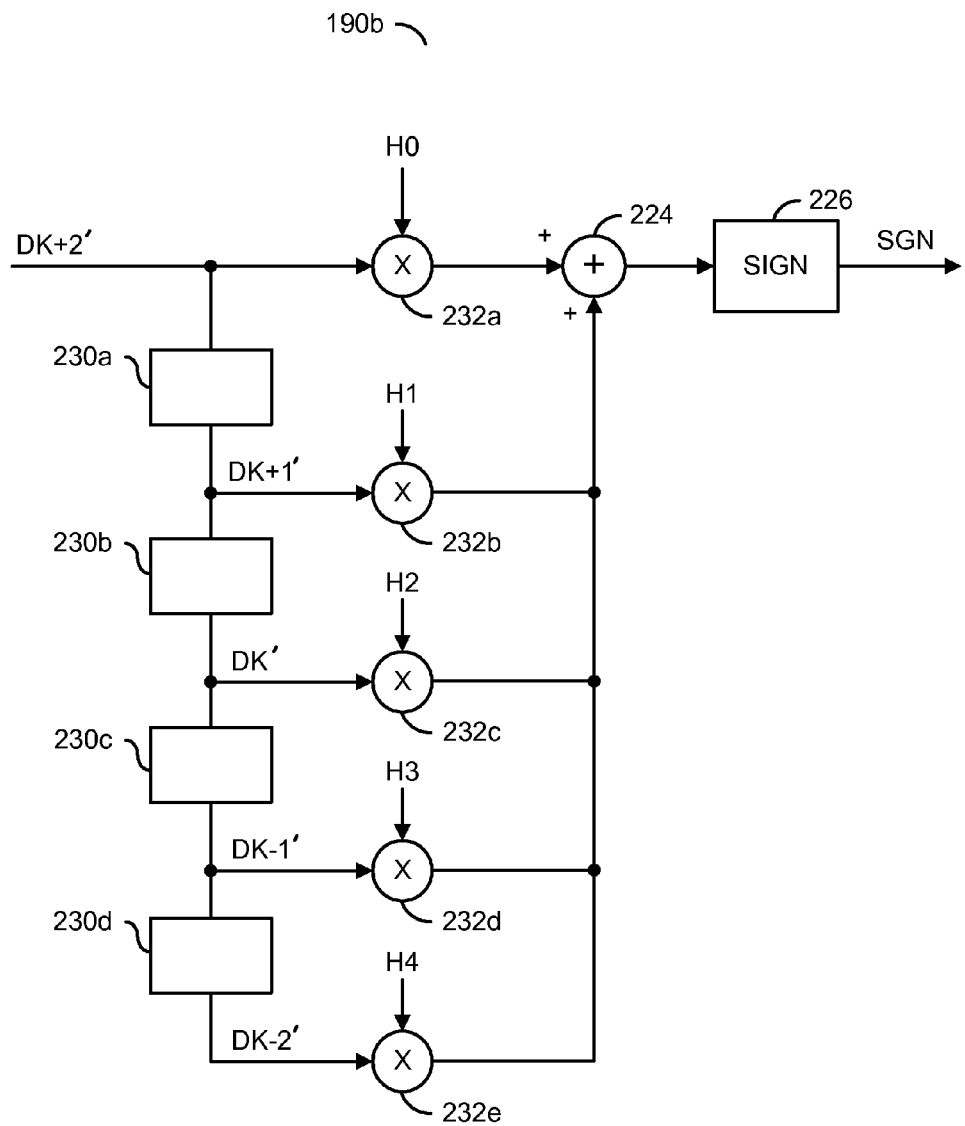
FIG. 9 is a block diagram of an example implementation of another data filter circuit.

Referring to FIG. 9, a block diagram of an example implementation of a circuit 190b is shown. The circuit 190b may be an embodiment of the circuit 190. The circuit 190b generally comprises multiple blocks (or circuit) 230a-230d, multiple blocks (or circuits) 232a-232e, the circuit 224 and the circuit 226. The circuits 230a-232e may represent modules and/or blocks that may be implemented as hardware, software, a combination of hardware and software, or other implementations. The signal DK' may be received by the circuit 220a. The circuit 226 may generate the signal SGN.

Each circuit 230a-230d may implement a register circuit. The circuits 230a-230d may be connected sequentially such that consecutive recovered data values (e.g., 5 consecutive values $D_{(K+2)}$ to $D_{(K-2)}$) may be shifted from the circuit 230a to the circuit 230e. The signal DK+2' may be transferred to the circuit 232a. Each circuit 230a-230d may generate a corresponding output in a signal (e.g., DK+1' to DK−2') transferred to the circuits 232b-232e.

Each circuit 232a-232e may implement a multiplication circuit. The circuits 232a-232e are generally operational to multiply the recovered data value received from the corresponding signal DK+2' and the circuits 230a-230d by respective weight tap weights (e.g., $H_0$-$H_4$). The tap weights may be received as components (e.g., H0-H4) of the signal M. Each product calculated by the circuit 232a-232e may be presented to the circuit 224. The circuit 224 may add the product values. The circuit 226 may calculate the sign samples for the sum values received from the circuit 224. Other embodiments of the circuit 190 may be implemented to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 2-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a transmitter having a filter coupled to a communication channel, said transmitter being configured to adjust said filter using information based on an estimate of one or more characteristics of said communication channel, wherein said estimate is generated by (i) disabling said filter in said transmitter, (ii) adapting a plurality of codes of a plurality of decision feedback equalizer tap weights in a receiver to said communication channel and (iii) normalizing each of said codes.

2. The apparatus according to claim 1, further comprising (i) a second transmitter co-located with said receiver and (ii) a second receiver co-located with said transmitter, wherein said second transmitter is configured to send said information to said second receiver via a second communication channel.

3. The apparatus according to claim 1, wherein (i) said transmitter is further configured to transmit across said communication channel to said receiver while said estimate is being generated in said receiver and (ii) said characteristic comprises a channel pulse response.

4. The apparatus according to claim 1, wherein said estimate comprises a plurality of estimate values calculated based on one or more converged tap weight values of a decision feedback equalizer in said receiver.

5. The apparatus according to claim 4, wherein said estimate values comprises said plurality of codes of said plurality of decision feedback equalizer tap weights in said receiver.

6. The apparatus according to claim 4, wherein (i) said receiver comprises a receiver adaptation control block configured to adapt said decision feedback equalizer and (ii) each of said codes is based on (a) a corresponding one of said decision feedback equalizer tap weights generated by said receiver adaptation control block, (b) a step size of said corresponding decision feedback equalizer tap and (c) a tap position of said corresponding decision feedback equalizer tap.

7. The apparatus according to claim 1, wherein said receiver is configured to generate said information based on (i) a signal recovered by said receiver from said communication channel, (ii) an error signal and (iii) said estimate.

8. The apparatus according to claim 7, wherein (i) said receiver is further configured to filter said signal based on said estimate and (ii) said filtering in said receiver is different according to each of a plurality of settings being adapted in said filter of said transmitter.

9. The apparatus according to claim 1, wherein said normalizing of each of said codes is based on (a) a step size of a corresponding one of a plurality of decision feedback equalizer taps and (b) a tap position of said corresponding decision feedback equalizer tap.

10. The apparatus according to claim 1, wherein said apparatus is implemented as one or more integrated circuits.

11. A method for back channel adaptation, comprising the steps of:
   (A) filtering in a transmitter coupled to a communication channel;
   (B) adjusting said filtering using information based on an estimate of one or more characteristics of said communication channel;
   (C) disabling said filtering in said transmitter;
   (D) adapting a plurality of codes of a plurality of decision feedback equalizer tap weights in a receiver to said communication channel; and
   (E) normalizing each of said codes.

12. The method according to claim 11, further comprising the step of:
   sending said information from a second transmitter to a second receiver via a second communication channel, wherein (i) said receiver is co-located with said second transmitter and (ii) said transmitter is co-located with said second receiver.

13. The method according to claim 11, further comprising the step of:
   transmitting from said transmitter across said communication channel to said receiver while said estimate is being generated in said receiver, wherein said characteristic comprises a channel pulse response.

14. The method according to claim 11, wherein said estimate comprises a plurality of estimate values calculated based on one or more converged tap weight values of a decision feedback equalizer in said receiver.

15. The method according to claim 14, wherein said estimate values comprises said plurality of codes of said plurality of decision feedback equalizer tap weights in said receiver.

16. The method according to claim 14, further comprising the step of:
   adapting said decision feedback equalizer tap weight values, wherein each of said codes is based on (i) a corresponding one of said decision feedback equalizer tap weights, (ii) a step size of said corresponding decision feedback equalizer tap and (iii) a tap position of said corresponding decision feedback equalizer tap.

17. The method according to claim 11, further comprising the step of:
   generating said information in said receiver based on (i) a signal recovered by said receiver from said communication channel, (ii) an error signal and (iii) said estimate.

18. The method according to claim 17, further comprising the step of:
   filtering said signal in said receiver based on said estimate, wherein said filtering in said receiver is different according to each of a plurality of settings being adapted in said filter of said transmitter.

19. The method according to claim 11,
   wherein said normalizing of each of said codes is based on (i) a step size of a corresponding one of a plurality of decision feedback equalizer taps and (ii) a tap position of said corresponding decision feedback equalizer tap.

20. An apparatus comprising:
   means for transmitting having a filter coupled to a communication channel;
   means for adjusting said filter using information based on an estimate of one or more characteristics of said communication channel;
   means for disabling said filtering in said transmitter;
   means for adapting plurality of codes of a plurality of decision feedback equalizer tap weights in a receiver to said communication channel; and
   means for normalizing each of said codes.

* * * * *